Figure 1:
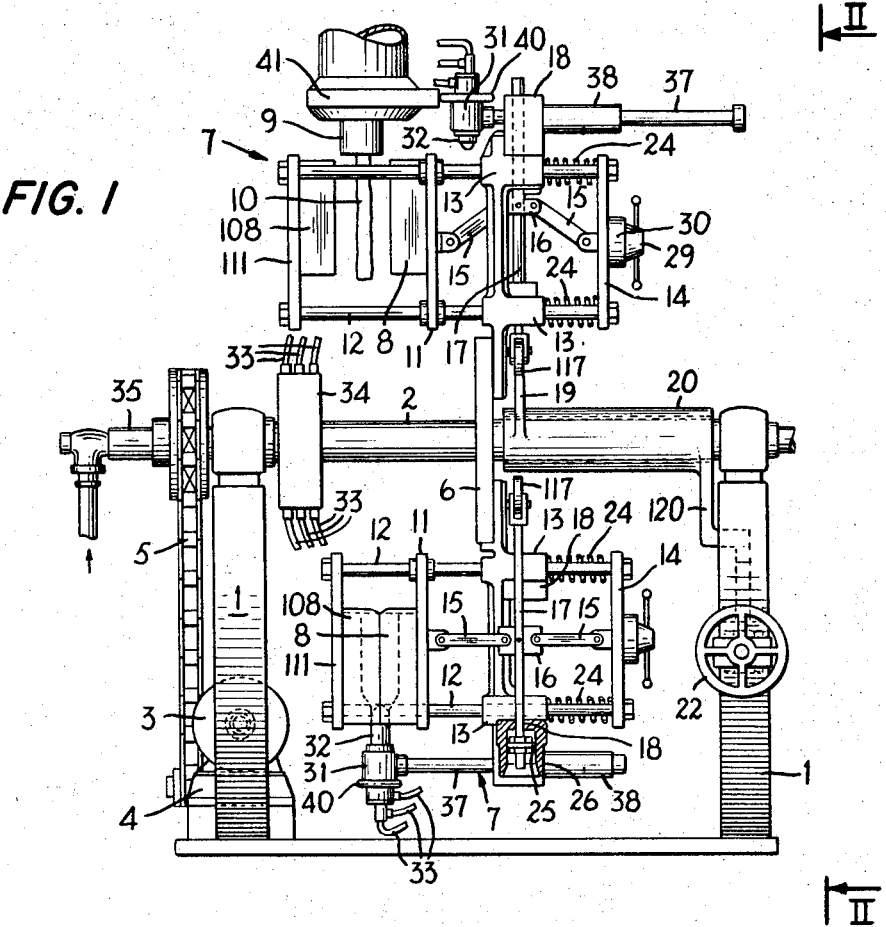

Oct. 3, 1967

N. MARTELLI 3,344,471

AUTOMATIC ROTARY MACHINE FOR BLOWING HOLLOW
BODIES, PARTICULARLY BOTTLES, OF
THERMOPLASTIC MATERIAL

Filed Aug. 18, 1964

3 Sheets-Sheet 1

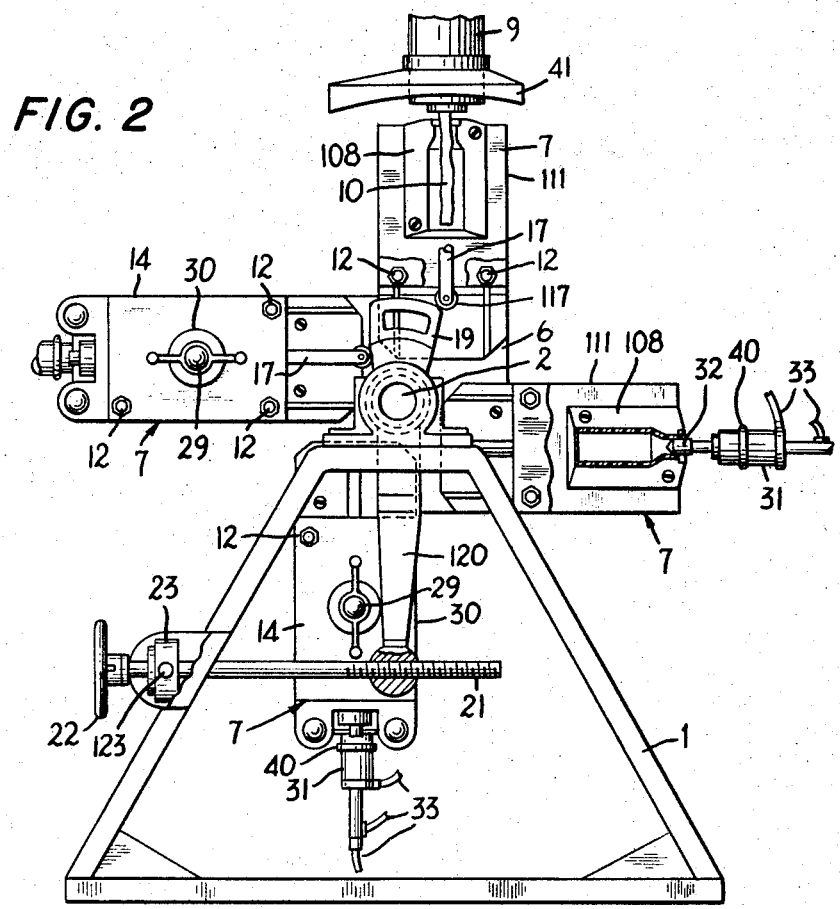
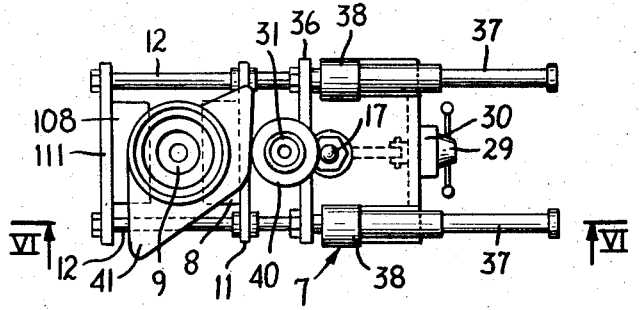

Oct. 3, 1967

N. MARTELLI 3,344,471

AUTOMATIC ROTARY MACHINE FOR BLOWING HOLLOW BODIES, PARTICULARLY BOTTLES, OF THERMOPLASTIC MATERIAL

Filed Aug. 18, 1964

3 Sheets-Sheet 3

United States Patent Office 3,344,471
Patented Oct. 3, 1967

3,344,471
AUTOMATIC ROTARY MACHINE FOR BLOWING HOLLOW BODIES, PARTICULARLY BOTTLES, OF THERMOPLASTIC MATERIAL
Nerio Martelli, Bologna, Italy, assignor to Solvay & Cie, Brussels, Belgium, a Belgian company
Filed Aug. 18, 1964, Ser. No. 390,403
Claims priority, application Italy, Aug. 29, 1963, 18,032/63
4 Claims. (Cl. 18—5)

The present invention relates to an automatic rotary machine for blowing hollow bodies, and particularly bottles or similar objects, of thermoplastic material.

It relates more particularly to the construction of a simple and economical machine having a working speed and output considerably higher than those of previously known machines.

The machine according to the invention comprises one or more blowing units, each comprising an opening mold and a blowing head mounted on a rotary support, in such a manner as to be presented one after the other under an extrusion head, which delivers the tube to be blown into said mold. The rotary support preferably turns continuously and at constant speed. Means are provided, which will be described in detail hereinbelow, for opening each mold before it passes under the extrusion head and in order to close it under the extrusion head. The blowing heads are disposed on the top side of each mold. The heads can be displaced laterally in relation to their trajectory, and means are provided for temporarily withdrawing said blowing heads from the blast orifice of the molds when the latter pass under the extrusion head, so as to avoid a collision between said blowing heads and the extrusion head or the extruded tube.

The rotary support of the blowing units is adapted to turn around a substantially vertical or horizontal axis, that is to say it may be constructed in the form of a roundabout or of a drum.

According to another characteristic of the invention, the opening and closing of each mold, constituted by two complementary half-molds, are effected by a toggle device. This device is composed of two symmetrical levers which are articulated at one end on an axis sliding in a suitable guide, the second end of one lever being articulated on one half-mold while the end of the other lever is articulated on a movable counter-member coupled to the other half-mold by any suitable means. This coupling is preferably effected by means of an axis which slides in a guide and on which the first mentioned half-mold is mounted slidably. The molds are opened and closed by a suitable movement of one of the elements of their toggle device, or of one of the elements which are connected to it. This movement is preferably controlled by a cam device, with or without the assistance of a return spring.

For the purpose of opening and closing the blowing molds, this toggle device provides, by very simple constructional means, a synchronised movement of the half-molds away from and towards one another, and thus ensures maximum accuracy of operation.

This device can also advantageously be applied to other types of machines for the blowing of hollow bodies of thermoplastic material, for example to a machine with alternating operation and rectilinear movement of the molds.

These and other features, and also the advantages which derive therefrom, will be clearly seen from the following description of one preferred embodiment which illustrates the invention by way of example and without limitation.

Figure 3:
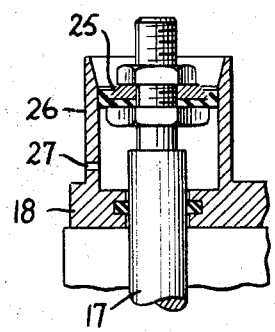
Figure 6:
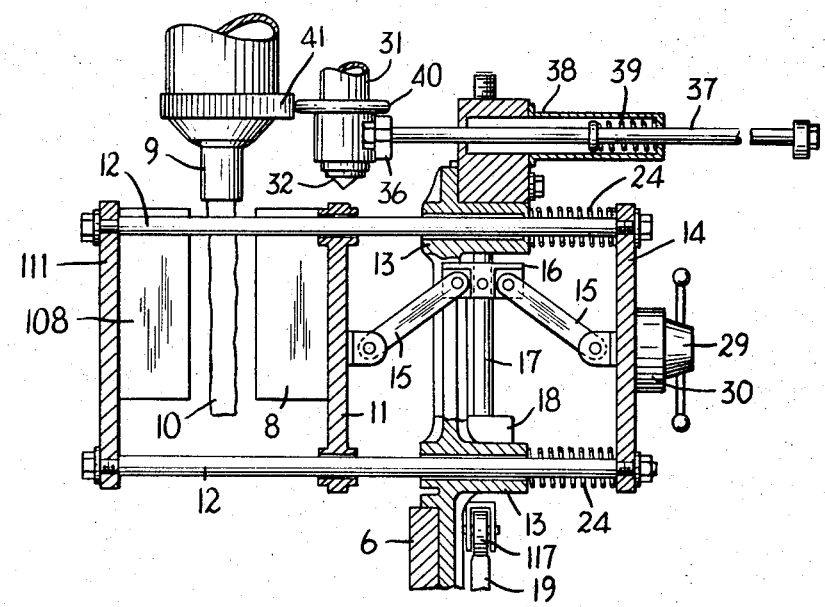
Figure 7:
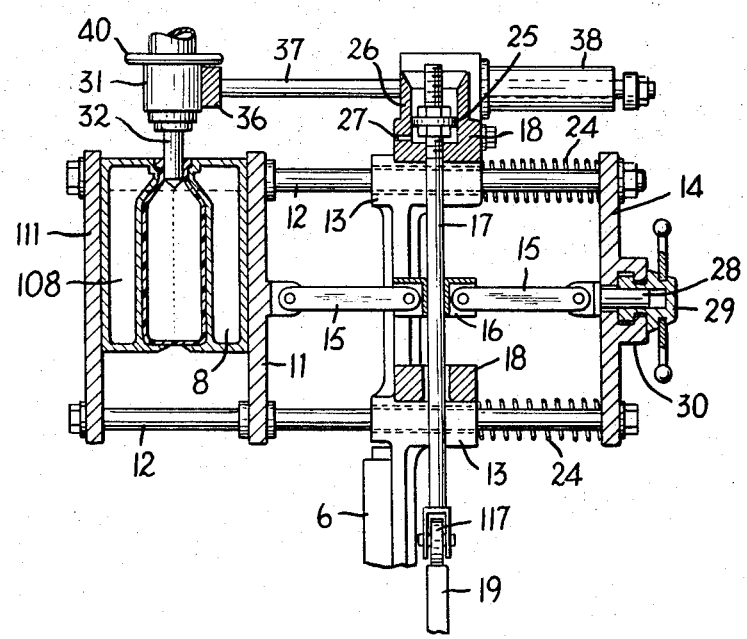

In the description which follows, reference will be made to the accompanying drawings, in which:

FIGURE 1 illustrates in elevation a rotary blowing machine according to the invention with certain parts shown in section, FIGURE 2 illustrates the same machine viewed in profile in the direction of the arrows II—II in FIGURE 1, with certain parts viewed in section, FIGURE 3 illustrates a section on a larger scale of a detail of FIGURE 1, FIGURES 4 and 5 illustrate in plan view a blowing unit, slightly before and during its passage under the extrusion head respectively, FIGURE 6 illustrates in section and on a larger scale a blowing unit at the moment of its passage beneath the extrusion head, viewed along the line VI—VI in FIGURE 5, FIGURE 7 illustrates in section and on a larger scale a blowing unit directly after its passage beneath the extrusion head, viewed along the line VII—VII in FIGURE 4.

Referring to the drawings, the machine according to the invention for blowing hollow bodies, and particularly bottles or similar objects, of thermoplastic material is constituted by a frame 1 on which there is mounted movably a horizontal axis 2 driven by the motor 3 through the medium of reduction gearing and a speed variator 4 and a chain transmission 5. On the shaft 2 there is fixed a support member 6, to which a plurality of angularly spaced blowing units 7 are connected.

Each blowing unit 7 comprises an opening mold composed of two complementary half-molds 8 and 108, adapted to assume positions in which they are close to and at a distance from one another, by a movement parallel to the shaft 2, that is to say a transversal displacement in relation to the trajectory of the corresponding blowing unit 7. The shaft 2 turns continuously and at constant speed, bringing in succession the half-molds 8, 108 of each blowing unit 7 beneath an extrusion head 9 or beneath any other device supplying a softened tube 10 of thermoplastic material, from which the bottle is formed by blowing in the half-molds 8, 108.

The half-molds 8, 108 of each blowing unit 7 are each fixed interchangeably on corresponding mold carrer parts 11, 111. The mold carrier part 111 is fixed to the axis 12 which slides through the guide 13 fixed on the support part 6. This axis 12 is connected at its opposite end to the counter-member 14. The other mold carrier part 11 is mounted movably on the axis 12.

The half-molds 8, 108 of each blowing unit 7 are opened and closed through the medium of a toggle device, comprising two symmetrical levers 15, one of which is articulated to the mold carrier part 11 and the other to the counter-member 14 secured to the mold carrier part 111. The levers 15 are in addition articulated to one another, being supported on an intermediate element 16, which is fixed to a push-rod 17. This rod 17 slides in the radial direction in the guide 18 and its bottom end, provided with a roller 117, cooperates with a fixed cam 19 forming an integral part of a tube 20 mounted loose on the shaft 2. This tube has an arm 120. A regulating shaft 21 provided with a handwheel 22 is screwed through the end of the arm 120 of the cam carrier 20. By rotation the regulating shaft is adapted to slide axially in a bearing 23, which in turn is mounted on the frame 1 of the machine in such a manner as to be oscillatable about the transverse axis 123. By turning the shaft 21 by means of the handwheel 22, the angular position of the arm 120 is varied, and therefore also the angular position of the cam carrier tube 20 on the shaft 2, thus permitting regulation of the cam 19.

The springs 24, interposed between the counter-member 14 and the guide 13 of the axis 12 urge the molds of each blowing unit 7 into the closed position, thus having the effect of opening the toggle joint, that is to say bringing into alignment with one another the two levers 15 and connecting the two half-molds 8, 108 as illustrated in FIGURE 7 and in the bottom part of FIGURE 1.

During the rotation of each of the blowing units 7, when the latter reach a determined point in front of the extrusion head, the roller 117 on the rod 17 slides on to the cam 19, which pushes the rod 17 outwards. This rod in turn effects the operation of the toggle device constituted by the levers 15 and the intermediate parts 16, so that the levers 15 form an angle with one another, as illustrated in FIGURE 6 and in the top part of FIGURE 1. Consequently, the mold-carrier part 11 and the counter-part 14 are brought close to one another, compressing the springs 24 and consequently the two mold-carrier parts 11, 111 move apart a corresponding distance, thus opening the mold 8, 108.

Each blowing unit 7 is thus presented with its mold 8, 108 open beneath the extrusion head 9 through which the tube 10 of softened plastic material is extruded. The tube 10 thus passes between the two half-molds 8, 108. At this moment, that is to say at the precise moment when the extruded tube 10 is situated exactly at the centre of the two half-molds 8, 108, the roller 117 of the push-rod 17 moves off the cam 19, which effects the instantaneous closing of the mold under the action of the springs 24, which bring the levers 15 of the toggle joint into alignment again.

Because of the type of toggle control described, the two half-molds can be brought against one another rapidly and in an accurately synchronised manner, thus ensuring the correct centering of the tube 10 when the mold is closed. This centering can be regulated by acting on the position of the cam 19, through the medium of the handwheel 92, which may be provided with a rocking system, not shown. The centering of the tube in the mold may be still further improved by fixing a centering fork, not illustrated, on part of one of these half-molds.

The blowing units also contain a device for braking the movement of the half-molds towards one another at the end of the stroke, in order to avoid too violent a closing under the action of the springs 24. For this purpose the end of each push-rod 17 is provided at the top with a piston 25, which is received in a fluid-tight manner in a cylinder 26 mounted on the guide 18 of the rod 17. This cylinder 26 is provided with an air evacuation hole 27 near its bottom. When the half-molds 8, 108 are brought towards one another, the piston 25 compresses the air imprisoned in the cylinder 26, and thus, particularly at the end of the stroke, brakes the movement of the push-rod 17 and therefore the movement of the half-molds 8, 108 towards one another. This braking action may be regulated by varying the size of the air evacuation hole 27, for example with the aid of a cock or any other means.

The toggle lever 15 fixed to the counter-member 14 is articulated on a threaded pivot 28 screwed into a die 29 mounted in such a manner that simply by the rotation of the die 29 the pivot can be moved axially in a seat 30 provided on the counter-member 14. This arrangement permits regulation of the reciprocal positions of the two half-molds 8, 108.

Because of the arrangement of the axis 12, the tube 10 leaving the extrusion head 9 can penetrate between the two half-molds 8, 108.

In addition, as is clearly seen in FIGURE 2, the extrusion head 9 is not situated exactly on a line perpendicular to the shaft 2, but is slightly offset towards the front of said shaft in relation to its direction of rotation. In addition, the axes of the molds 8, 108 of each blower unit 7 do not occupy an exactly radial position in relation to the shaft 2, but are tangent to an imaginary circle coaxial with said shaft.

In order that in the course of its rotation each mold 8, 108 may take up position coaxially beneath the extrusion head 9, the molds, or at least their top part, describe a descending trajectory. These arrangements enable the extrusion head to be placed in a lower position or one closer to the molds, without there being any danger of collision between the moving and fixed parts.

After the closing of the mold, the tube 10 of softened plastic material imprisoned between the two half-molds 8, 108, is separated from the extrusion head and inflated in the mold by the insufflation of air. For this purpose each blowing unit 7 also has a blowing head 31, known per se, disposed on the upper side of the molds 8, 108, that is to say on the side of the mold which passes beneath the extrusion head. Each blowing head 31 comprises a blowing nipple 32 sliding axially and normally retracted in the head 31, as illustrated in FIGURE 6. At certain moments this nipple may be partly expelled from the head 31 and introduced into the top end of the tube 10 of plastic material enclosed between the two half-molds 8, 108, as can be seen in FIGURE 7.

The movements of the blowing nipple 32 are for example effected pneumatically by a known device enclosed in the blowing head 31. The compressed air necessary for the aforesaid movements of the blowing nipple 32 and for the blowing of the tube 10 enclosed in the mold is supplied to the various blowing heads 32 through a rotating joint 35 and the hollow shaft 2 and through the medium of an automatic distributor 34 and flexible tubes 33.

The blowing head 31 of each blowing unit 37 is fixed to a cross-member 36 mounted on an axis 37 which slides parallel to the shaft 2 in a guide 38. The springs 39 push the blowing head 31 towards the mold 8, 108 and normally hold it in a position coaxial to the blowing mouth of the closed mold, as illustrated in FIGURES 4 and 7.

In addition, the blowing head 31 is provided with a loose roller 40 cooperating with a fixed cam or guide 41 provided on the extrusion head 9. During the rotation of the support 6 with the blowing unit 7, the roller 40 of the blowing head 31, comes into contact with the cam 41 (FIGURE 4) which pushes the head 31 backwards against the action of springs 39 and thus moves it laterally away from the extrusion head 9, thus preventing any collision with the extrusion head (FIGURES 5 and 6. After the closure of the half-molds 8, 108 and their passage beneath the extrusion head, the roller 40 of the blowing head leaves the cam 41 and the springs 39 bring the blowing head 31 forwards again into its position coaxial with the molds 8, 108. This movement may be controlled by a guide, not shown, fixed to the frame 1 of the machine and preventing any vibration of the axes 37, by acting on the opposite end of the latter to the blowing heads.

As soon as the blowing heads 31 have resumed their position above the molds, the compressed air distributor 34 first introduces the blowing nipple 32 into the tube 10 of plastic material enclosed in the mold, and then effects the insufflation of air through said nipple (FIGURE 7).

The blowing nipple 32 is thereupon again retracted into the blowing head 31 and the molded object drops from the mold when the latter is opened slightly before it next passes beneath the extrusion head.

The blowing nipple 32 may also be held in position during the opening of the molds and thus facilitate removal from the molds, by effecting the expulsion of the molded object by blowing compressed air through the nipple before the latter is retracted. The blowing nipple may in this case be held laterally in position during the opening of the molds by a guide (not illustrated) fixed to the frame of the machine and acting on the opposite end of the axes 37 to the blowing heads. The molded objects expelled from the molds may be guided and collected with the aid of any suitable device. Thus for example, a collector in the form of a funnel may be fixed on the frame of the machine so that its widened part is beneath the molds, level with their opening, and so that its tail directs the objects removed rom the molds towards a discharge device.

Each mold 8, 108 may be cooled by the circulation of water, the cooling fluid being supplied and discharged with the aid of a rotating joint mounted on the hollow shaft 2 and of flexible tubes, not shown. In any case the cooling of the molds must not be violent, because the molded object describes a fairly large trajectory after its blowing and before its removal from the mold, so that it has a relatively long cooling time in the mold.

It is quite obvious that the invention is not limited to the embodiment which has just been described and illustrated, but that it may be subjected to modifications, particularly of a constructional nature, which do not depart either from its framework or from its spirit. Thus, for example, the characteristics of the invention such as the continuous rotation at constant speed of the blowing units, the operation of the molds by toggle devices, and so on, may also advantageously be applied to a machine in which blowing is effected by the opposite side of the molds to the extrusion head.

I claim:

1. An automatic rotary machine for continuously blowing a parison of a thermoplastic material to form hollow bodies, comprising a frame, a shaft rotatably mounted on the frame, means for continuously rotating the shaft, a plurality of blowing units mounted on the shaft at an angular displacement from one another and for rotation with the shaft, each of the blowing units comprising a pair of complementary half-molds adapted to assume alternatively a closed position and an open position, an extrusion head positioned at the periphery of the path of rotation of the pairs of half-molds for continuously feeding a parison of thermoplastic material to the pairs of half-molds, means for urging each of the pairs of half-molds into a closed position, means for moving each of the pairs of half-molds against said urging into an open position, said means for moving each of the pairs of half-molds into an open position comprising for each of the pairs of half-molds toggle joint means connected at one end to one of the half-molds of the pair and cam means mounted on the frame and positioned to engage the toggle joint means and thereby to open the pair of half-molds as the pair of half-molds is rotated into juxtaposition to the extrusion head and subsequently to disengage from the toggle joint means and thereby to permit the pair of half-molds to be closed by said urging means as the pair of half-molds is rotated out of juxtaposition to said extrusion head, and, in combination with each of the blowing units, a blowing head adapted to assume alternatively a position at the periphery of the pair of half-molds of the blowing unit for blowing into said pair of half-molds and a position displaced from said periphery of said pair of half-molds and means for moving the blowing head to said displaced position as said pair of half-molds is rotated into juxtaposition to the extrusion head.

2. An automatic rotary machine according to claim 1, further comprising, in combination with each of the blowing units, means for urging the blowing head to the position at the periphery of the pair of half-molds, the subsequent moving of the blowing head to said displaced position being effected against said urging.

3. An automatic rotary machine according to claim 2, in which said means for moving the blowing head to said displaced position comprises a cam positioned on the extrusion head for engaging the blowing head as the blowing unit is rotated into juxtaposition to the extrusion head.

4. An automatic rotary machine according to claim 1, further comprising for each of the blowing units means for braking the movement of the pair of half-molds from the open position to the closed position, said braking means comprising a fixed hollow cylinder having one end wall and being open at the other end and a piston connected to the toggle joint means and positioned in the cylinder for a downstroke in the cylinder toward the end wall of the cylinder when the toggle joint means is activated by the movement of the pair of half-molds from the open position to the closed position, said cylinder having below the terminus of the downstroke of the piston a restricted passage communicating between the interior of the cylinder and the ambient for the release at a restricted rate of air compressed in the cylinder by the downstroke of the piston.

References Cited
UNITED STATES PATENTS

| | | | |
|---|---|---|---|
| 3,005,231 | 10/1961 | Pechthold | 18—5 |
| 3,081,589 | 3/1963 | Jackson et al. | 18—5 |
| 3,103,701 | 9/1963 | Calchera et al. | 18—16 |

FOREIGN PATENTS

| | | |
|---|---|---|
| 1,314,044 | 11/1962 | France. |

J. SPENCER OVERHOLSER, *Primary Examiner.*

WILBUR L. McBAY, *Examiner.*